United States Patent [19]

Botnen

[11] 4,099,165
[45] Jul. 4, 1978

[54] FIRE DETECTION APPARATUS IN A PREHEATER

[75] Inventor: Trygve Botnen, Nacka, Sweden

[73] Assignee: Svenska Rotor Maskiner Aktiebolag, Nacka, Sweden

[21] Appl. No.: 751,214

[22] Filed: Dec. 16, 1976

[30] Foreign Application Priority Data

Dec. 19, 1975 [GB] United Kingdom ............... 52114/75

[51] Int. Cl.² .............................................. G08B 17/06
[52] U.S. Cl. ........................................ 340/589; 165/5; 165/11; 340/599; 340/57
[58] Field of Search ..................... 340/233, 228 R, 57; 60/277; 165/5, 11

[56] References Cited

U.S. PATENT DOCUMENTS

| | | | |
|---|---|---|---|
| 2,901,740 | 8/1959 | Cutsogeorge | 340/233 |
| 3,060,417 | 10/1962 | Blake | 340/233 |
| 3,775,745 | 11/1973 | Kelley | 340/57 |
| 3,861,458 | 1/1975 | Ostrander et al. | 165/5 |

Primary Examiner—Glen R. Swann, III
Attorney, Agent, or Firm—Flynn & Frishauf

[57] ABSTRACT

A fire detection apparatus in a rotary regenerative air preheater comprises a plurality of temperature sensitive detectors which produce an electrical signal, and means for differentiating the electrical signals from the detectors. The differentiated signals are passed through a low pass filter having a large time constant and are then fed to a comparator which actuates a signalling device when the low pass filter output signal exceeds a predetermined value.

9 Claims, No Drawings

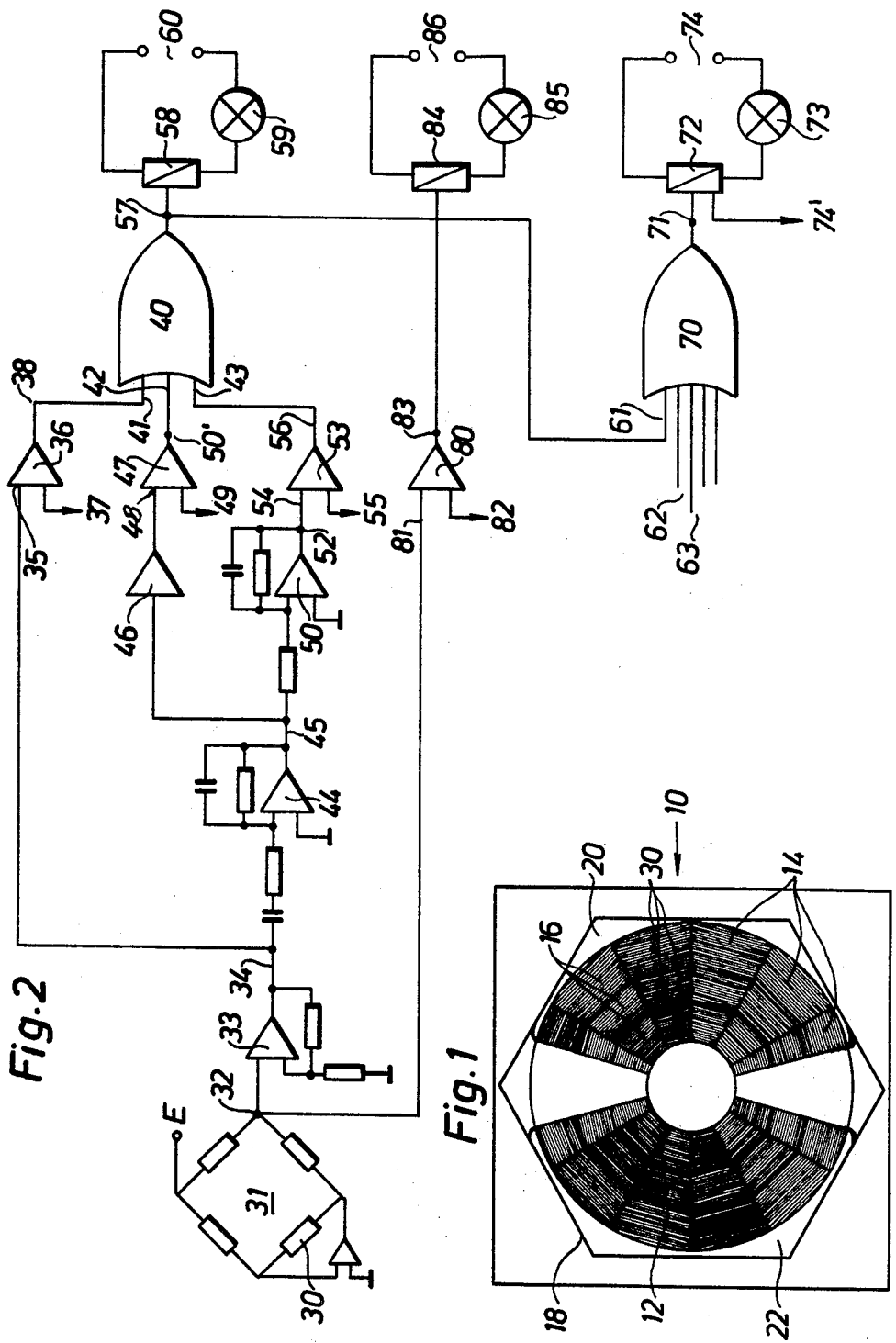

FIRE DETECTION APPARATUS IN A PREHEATER

BACKGROUND OF THE INVENTION

This invention relates to fire detection apparatus in a preheater, such as a rotary regenerative air preheater, comprising a preheater housing with an air duct and an exhaust duct, a mass of heat absorbent material in said housing, means for imparting a relative rotation between the mass of material and the ducts, a plurality of temperature sensitive detectors sensing the temperature of radially adjacent sections of the material in said housing to each produce a signal proportional to the temperature in said respective sections and means actuated by said signals for indicating when a rate of change of the temperature in any of said sections is in excess of a predetermined rate of change.

As hot exhaust gases traverse the heat absorbent material unburned fuel and/or soot is frequently deposited on the material. These deposits may in a short time build up to a point where air or gas flow will be partially restricted. Moreover, heat will frequently begin to be exothermically generated in such deposits to a point where the deposits will glow and cause an incipient fire or a so called "hot-spot" which may rapidly increase in temperature to such an extent that surrounding metal will ignite causing serious damage to the surrounding structure.

Known prior art is represented by e.g. British Pat. Specification No. 1 126 466 showing an air preheater and a fire detection apparatus having a plurality of temperature sensitive detectors each comprising a fast response thermocouple and a slow response thermocouple adapted to signal when a temperature within the preheater changes at a rate of change in excess of a predetermined rate of change.

As a rule fires start connection with starting-up and load variation operations during which operations, however, the known fire detection apparatus indicates a rate of temperature change in excess of the predetermined rate of change, i.e. the known apparatus is inoperative during the most dangerous working operations.

The object of the present invention is to eliminate this serious drawback of the known apparatus and provide an improved fire detecting apparatus which is operative during starting-up periods as well as during normal operation.

Another object of the invention is to provide a simple and uncomplicated apparatus in which each temperature sensitive detector comprises a single thermocouple or similar temperature sensing member.

SUMMARY OF THE INVENTION

According to the invention each single detector is connected via amplifying means to a circuit producing an output signal, proportional to the derivative of the input signal which output signal is received by a comparator means adapted to actuate a signalling device when said output signal exceeds a predetermined value. Moreover, in accordance with a preferred embodiment of the invention said output signal is supplied to a low-pass filter means having a large time constant as compared with the time constant of the detectors, the output signal of said filter being received by a second comparator connected to a first input terminal of an OR-gate feeding said signalling device, said OR-gate having a second input terminal receiving said output signal from said differentiating circuit. Each temperature sensitive detector is preferably connected to a third comparator feeding a third input terminal of said OR-gate.

BRIEF DESCRIPTION OF THE DRAWINGS

An embodiment of the invention will now be described by way of example with reference to the accompanying drawing wherein:

FIG. 1 is a plan view of a rotary regenerative air preheater; and

FIG. 2 is a wiring diagram of the fire detection apparatus shown in FIG. 1.

DETAILED DESCRIPTION

In the drawing a rotary regenerative air preheater 10 is shown having a permeable mass of heat absorbing material in the form of a rotor 12 comprised of sectorial compartments 14 which are subdivided into sections 16 each containing a heat exchanging mass comprised of plate elements. Surrounding the rotor 12 is a generally cylindrical housing 18 having at each end a pair of essentially diametrically opposed ducts, 20, 22 one being an air duct 20 and the other an exhaust duct 22, the ducts being axially in line so that air and exhaust gas may pass axially through the mass of heat exchanging material.

The rotor 12 is rotatably mounted in the housing 18 so that, in operation, the exhaust gas continually heats the mass of heat exchanging material, and the air passing through at the other side continually removes heat from the mass of heat exchanging material.

The hot exhaust gas inlet duct 22 is positioned above the upper portion of the rotor 12 and is open to the rotor through a suitably shaped segmental aperture in the housing 18. A similar discharge duct for the exhaust gas in positioned underneath the rotor. The air inlet duct is positioned at the bottom of the housing at the opposite side of the housing and the air outlet duct 20 at the top of the housing.

In order to enable detection of fire in the rotor in the form of ignition of combustible deposits on the mass of metal material, the air preheater is provided with an array or an arrangement of a series of stationary temperature sensitive detectors 30, for instance thermocouples or resistance wires or thermometers which are laterally adjacent one another and are located so that the free flow of air around the detectors 30 is permitted.

As shown in FIG. 2, each detector means 30 forms a part of a constant-current bridge 31 the output terminal 32 of which is connected to an amplifier 33. The output terminal 34 of said amplifier 33 is connected to a first input terminal 35 of a comparator 36 in which the input signal is compared with a reference signal fed to a second input terminal 37. When the input signal is less than the reference signal a "0"-signal appears at the output terminal 38 of the comparator 36 and when the input signal is larger than the reference signal a "1"-signal appears at the output terminal 38, which signal is supplied to a first input terminal 41 of an OR-gate 40.

The output terminal 34 of said amplifier 33 is also connected to a filter circuit 44 of the type presenting a signal at the output terminal 45 proportional to the time-derivative of the input signal (i.e., a differentiating circuit 44). The output terminal 45 is via an amplifier 46 connected to a further comparator 47 similar to comparator 36 and having an input signal terminal 48 and a reference input terminal 49. The output terminal 50' of the comparator 47 is connected to a second input terminal 42 of said OR-gate 40.

The output terminal 45 is also connected to a low-pass filter circuit 50 of the type having a very large time-constant of about 50 seconds. The output terminal 52 of said low-pass filter is connected to a further comparator 53 similar to comparator 36 and having an input signal terminal 54 and a reference input terminal 55. The output terminal 56 of the comparator 53 is connected to a third input terminal 43 of said OR-gate 40.

When a signal is supplied to any one of the input terminals 41, 42 or 43 of OR-gate 40 an output signal appears at the output terminal 57 which is connected to a relay 58 which in turn is arranged to control the current in an open-circuit alarm circuit containing a lamp 59 and a voltage source 60 connected in series.

The output terminal 57 of said OR-gate 40 is also connected to a first input terminal 61 of a further OR-gate 70. Further input terminals 62, 63 . . . of said Or-gate 70 are connected to further output terminals corresponding to the output terminal 57, said further output terminals being associated with further circuits controlled by said further detectors.

When a signal appears ay any one of said input terminals 61, 62, 63 . . . of the OR-gate 70 an output signal appears at the output terminal 71 of the OR-gate 70 which terminal 71 is connected to a relay 72 which in turn is arranged to control the current in an open-circuit main alarm circuit containing a lamp 73 and a voltage source 74 connected in series. A reset line 74' is connected to the relay 72 in the usual manner.

The output terminal 32 of the bridge 31 is connected to an input terminal 81 of a further comparator 80 similar to the comparator 36 and having a reference input terminal 82.

The output terminal 83 of the comparator 80 is connected to a relay 84 which is arranged to control the current in a closed-circuit alarm circuit containing a lamp 85 and a voltage source 86 connected in series.

Under normal conditions no signal is fed to comparator 80 and, accordingly the relay 84 is not energized, i.e. the lamp 85 is on indicating normal conditions.

When a detector 30 detects a defect, i.e. a detector leg of bridge 31 is broken, the bridge becomes unbalanced and the signal at terminal 32 becomes very large, comparator 80 is activated and relay 84 is energized in order to disconnect the lamp 85 from the voltage source 86.

When a fire is started in the mass of heat exchanging material a change of temperature is indicated by one of the temperature sensitive detectors 30 e.g. when a "hot-spot" passes the detector.

If the signal at terminal 45 representing the rate of change after amplification is large enough to activate comparator 47 a signal appears at the second input terminal 42 of said OR-gate 40 and the alarm circuit 58, 59, 60 is activated indicating a fire in the shape of a "hot-spot."

At the same time the signal at terminal 35 amplified by amplifier 33 is supplied to OR-gate 40 via comparator 36. If the absolute temperature is large enough the relay 58 is energized and lamp 59 is connected to voltage source 60 indicating that the temperature is too large in the rotor. The signal at terminal 57 is also supplied to OR-gate 70 for energizing relay 72 in order to activate the main alarm device.

If the signal at terminal 45 changes very slowly so that it is capable of passing the low-pass filter 50 having a time-constant of for instance 50 seconds and the signal is large enough to activate comparator 53 a signal will occur at the third input terminal 43 of the OR-gate 40, thus activating the alarm circuit 58, 59, 60 as described above. This third type of alarm indicates that a fire, e.g. a "hot-spot," has increased and includes a major part of the mass of heat exchanging material. Initially the temperature rises very slowly but if not indicated the rate of change will increase very fast with generally disastrous result.

What I claim is:

1. Fire detection apparatus in a preheater comprising:
   a preheater housing (18) having an air duct (20) and an exhaust duct (22);
   a mass of heat absorbent material in said housing;
   means for imparting a relative rotation between the mass of material and the ducts;
   a plurality of temperature sensitive detectors (30) for sensing the temperature of radially adjacent sections (16) of the material in said housing (18), each of said detectors producing a signal proportional to the temperature in its respective section (16); and
   at least one indicating means coupled to said detectors and actuated by said detector signals for indicating when a rate of change of the temperature in any of said sections is in excess of a predetermined rate of change, said indicating means comprising:
   a differentiating means (44) connected to said detectors for producing an output signal proportional to the derivative or rate of change of the input signal thereto;
   a low-pass filter means (50) coupled to receive said output signal of said differentiating means, said low-pass filter means having a large time constant as compared with the time constant of said detectors for producing a low-pass filter output signal;
   comparator means (53) coupled to receive said low-pass filter output signal and for producing a further signal at its output (56) when said low-pass filter output signal exceeds a predetermined value; and
   a signalling device coupled to said comparator means for signalling when said low-pass filter output signal exceeds said predetermined value.

2. Apparatus as defined in claim 1, wherein said indicating means further includes:
   a second comparator means (47) having an input connected to the output of said differentiating means (44), and an output (50'); and
   an OR-gate (40) having respective inputs (43;42) coupled to the outputs (56;50') of said first and second comparator means, the output (57) of said OR-gate feeding said signalling device.

3. Apparatus as defined in claim 2, wherein:
   said OR-gate (40) has a further input (41); and
   said indicating means further includes a third comparator means (36) coupled to said temperature sensitive detectors, the output (38) of said third comparator means feeding said further input terminal of said OR-gate.

4. Apparatus as defined in claim 3, wherein said indicating means further includes:
   a further comparator means (80) coupled to said temperature sensitive detectors; and
   means (84–86) coupled to said further comparator means for indicating normal conditions in said air preheater.

5. Apparatus as defined in claim 2, wherein said indicating means further includes:
   a further comparator means (80) coupled to said temperature sensitive detectors; and
   means (84-86) coupled to said further comparator means for indicating normal conditions in said air preheater.

6. Apparatus as defined in claim 1, wherein said indicating means further includes:
   a further comparator means (80) coupled to said temperature sensitive detectors; and
   means (84-86) coupled to said further comparator means for indicating normal conditions in said air preheater.

7. Apparatus as defined in claim 1, wherein said indicating means further includes:
   another comparator means (36) coupled to said temperature sensitive detectors; and
   an OR-gate (40) having respective inputs (43;41) coupled to the outputs (56;38) of said first and said another comparator means, the output (57) of said OR-gate feeding said signalling device.

8. Apparatus as defined in claim 9, wherein said preheater is an air preheater.

9. Apparatus as defined in claim 1, wherein said preheater is a rotary regenerative air preheater.

* * * * *

UNITED STATES PATENT AND TRADEMARK OFFICE
CERTIFICATE OF CORRECTION

PATENT NO. : 4,099,165
DATED : July 4, 1978
INVENTOR(S) : Trygve BOTNEN

It is certified that error appears in the above-identified patent and that said Letters Patent are hereby corrected as shown below:

On the initial page of the patent, after the printed Abstract, change "No Drawings" to --2 Drawing Figures--;

Column 6, line 12, change "claim 9" to --claim 1--.

Signed and Sealed this

Sixteenth Day of January 1979

[SEAL]

Attest:

RUTH C. MASON
Attesting Officer

DONALD W. BANNER
Commissioner of Patents and Trademarks